United States Patent
Worsley (10) Patent No.: US 8,874,703 B1
(45) Date of Patent: Oct. 28, 2014

(54) SYSTEM AND METHOD OF SELECTIVELY IMPLEMENTING NETWORK CONFIGURATIONS

(75) Inventor: Timothy C. Worsley, Snoqualmie, WA (US)

(73) Assignee: Amazon Technologies, Inc., Reno, NV (US)

(*) Notice: Subject to any disclaimer, the term of this patent is extended or adjusted under 35 U.S.C. 154(b) by 474 days.

(21) Appl. No.: 13/237,693

(22) Filed: Sep. 20, 2011

(51) Int. Cl.
*G06F 15/177* (2006.01)

(52) U.S. Cl.
USPC .......................... 709/220; 709/221; 713/100

(58) Field of Classification Search
USPC .................. 709/220–222; 713/100, 155–156
See application file for complete search history.

(56) References Cited

U.S. PATENT DOCUMENTS

| | | | |
|---|---|---|---|
| 5,680,547 A | 10/1997 | Chang | |
| 5,826,015 A | 10/1998 | Schmidt | |
| 5,892,906 A | 4/1999 | Chou et al. | |
| 6,484,262 B1 | 11/2002 | Herzi | |
| 7,194,619 B2 | 3/2007 | Abbondanzio et al. | |
| 7,313,690 B2 | 12/2007 | Miller | |
| 7,664,834 B2 * | 2/2010 | Keith, Jr. | 709/220 |
| 7,822,863 B2 * | 10/2010 | Balfanz et al. | 709/229 |
| 7,958,506 B2 | 6/2011 | Mann | |
| 8,102,881 B1 | 1/2012 | Vincent | |
| 8,332,490 B2 | 12/2012 | Bozek et al. | |
| 8,381,264 B1 | 2/2013 | Corddry et al. | |
| 8,386,589 B2 * | 2/2013 | Keefe et al. | 709/220 |
| 2004/0199758 A1 | 10/2004 | Meaney et al. | |
| 2005/0075115 A1 | 4/2005 | Corneille et al. | |
| 2006/0200539 A1 | 9/2006 | Kappler et al. | |
| 2009/0031026 A1 * | 1/2009 | Tanner et al. | 709/226 |
| 2009/0150525 A1 * | 6/2009 | Edgett et al. | 709/220 |
| 2009/0201830 A1 | 8/2009 | Angelot et al. | |
| 2009/0276618 A1 | 11/2009 | Madjlessi | |
| 2010/0017597 A1 * | 1/2010 | Chandwani | 713/156 |
| 2010/0191852 A1 * | 7/2010 | Black et al. | 709/225 |
| 2010/0325736 A1 | 12/2010 | Sadovsky et al. | |
| 2011/0125990 A1 | 5/2011 | Khosravi et al. | |
| 2011/0320799 A1 | 12/2011 | Lam | |
| 2012/0011354 A1 | 1/2012 | Owen | |
| 2012/0066750 A1 * | 3/2012 | McDorman et al. | 726/7 |
| 2012/0179900 A1 | 7/2012 | Temporelli | |
| 2012/0214441 A1 * | 8/2012 | Raleigh | 713/170 |
| 2012/0265984 A1 * | 10/2012 | Ramanujan | 713/155 |
| 2012/0272090 A1 | 10/2012 | Poisner | |
| 2012/0322422 A1 | 12/2012 | Frecks, Jr. et al. | |
| 2013/0013910 A1 | 1/2013 | Temporelli et al. | |

OTHER PUBLICATIONS

Office action for U.S. Appl. No. 13/231,523, mailed on Jan. 16, 2013, Worsley, "Secure Computer Provisioning and Operation", 10 pages.
Office action for U.S. Appl. No. 13/166,641, mailed on Dec. 13, 2012, Worsley, "Secure Computer Provisioning", 11 pages.

(Continued)

*Primary Examiner* — Bharat N Barot
(74) *Attorney, Agent, or Firm* — Lee & Hayes, PLLC (57) ABSTRACT

A local network can include a configuration server such as a DHCP server. When requesting a local network configuration from the server, a device may include credentials that can be verified by the server to establish that the device is authorized to use the local network. In addition, when providing a network configuration, the server may include its own credentials so that the device can determine whether the configuration has originated from a trusted server.

32 Claims, 5 Drawing Sheets

(56) References Cited

OTHER PUBLICATIONS

Office action for U.S. Appl. No. 13/166,610, mailed on Mar. 26, 2013, Worsley, "Global Computer Provisioning", 12 pages.

Final Office Action for U.S. Appl. No. 13/166,610, mailed on Oct. 11, 2013, Tmothy C. Worsley, "Global Computer Provisioning", 13 pages.

Office action for U.S. Appl. No. 13/166,641, mailed on Jul. 2, 2013, Worsley, "Secure Computer Provisioning", 14 pages.

Office action for U.S. Appl. No. 13/231,523, mailed on Aug. 21, 2013, Worsley, "Secure Computer Provisioning and Operation", 9 pages.

Office Action for U.S. Appl. No. 13/237,644, mailed on Mar. 27, 2014, Timothy C. Worsley, "Mobile Provisioning Device", 7 pages.

* cited by examiner

SYSTEM AND METHOD OF SELECTIVELY IMPLEMENTING NETWORK CONFIGURATIONS

BACKGROUND

Computers and other networked devices are often configured for operation and compatibility with their local network environments. Configuration variables include the network address of the computer, the network address of a router or network gateway, a subnet mask, name server specifications, and provisioning server specifications.

Device configuration can be performed manually, although this requires a user to have detailed information about the local network environment. Many computer devices can be configured to obtain and implement network configuration settings automatically, using an automated network configuration protocol such as Dynamic Host Configuration Protocol (DHCP). When using DHCP, a user device (referred to as a host) broadcasts a configuration request over the local network. If there is a DHCP server on the network, it receives the request and responds by providing network configuration parameters.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques that can be used to automatically configure computers, servers, and other networked devices in network environments that may not be controlled or secure. In environments such as these, dynamic configuration protocols such as DHCP are often insecure and unsupervised, and are therefore susceptible to attacks. As an example, a rogue DHCP server can be placed on a local network and used to provide incorrect configuration information to any computers on the local network that request automatic configuration. Similarly, rogue computer devices on the local network may request and receive configuration information from any DHCP server that is also on the local network.

This can become particularly problematic in environments in which servers and other devices are being configured and provisioned over the local network. In environments such as this, it may be possible for an attacker to take control of the automatic configuration process and to specify a rogue provisioning server, thereby gaining the ability to install malicious software on local computers.

In certain embodiments described herein, networked devices are preconfigured with security credentials that allow the networked devices to authenticate with a configuration server such as a DHCP server. The device credentials may be provided from a networked device to the configuration server, so that the configuration server can verify authorization of the networked device prior to issuing network configuration parameters. Similarly, the networked device may receive credentials from the configuration server, allowing the networked device to confirm that the configuration server is reliable and authentic.

In some situations, such as in large-scale server deployment environments, networked devices may register with the configuration server before being deployed, and the configuration server may issue configuration parameters only to those requesting computers that have previously registered.

Figure 1:
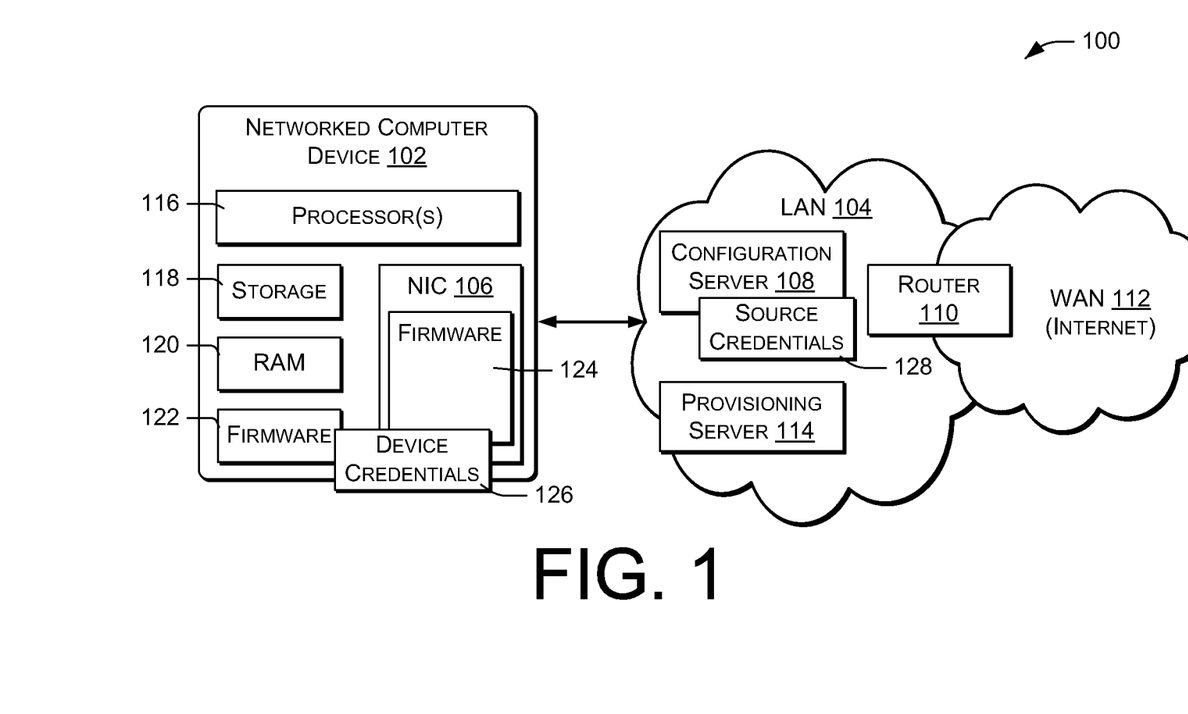
FIG. 1 is a block diagram illustrating a system for securely configuring networked computers using a dynamic configuration procedure.

FIG. 1 shows an environment 100 in which a networked computer device or host 102, referred to simply as the computer 102 in the following discussion, is configured to communicate using a local or local-area network (LAN) 104. In this embodiment, the computer 102 has a network interface, device or card 106 that is configured for communications through the local network 104.

The local network 104 may have one or more configuration servers or sources 108, which may comprise DHCP servers. The local network 104 may also have a network router or gateway 110 that enables communications to and from a wide-area network (WAN) 112, which may be a public network such as the Internet, and which may in turn provide a conduit for communications with a myriad of servers, services, components, and other private networks.

One or more provisioning servers 114 may also be present on the local network 104. The provisioning servers may be Pre-Execution Boot Environment (PXE) servers, from which the computer 102 can obtain bootable software images. The local network address of the provisioning server 114 is typically specified as part of DHCP communications between the computer 102 and the configuration server 108.

Conventional communications protocols such as the Internet Protocol (IP) may be used for communication between the various entities shown in FIG. 1. In particular, IP version 4 (IPV4) and/or version 6 (IPV6) may be used in certain embodiments.

The computer 102 may have a processor 116 that executes instructions and programs that are stored in or retrieved from various types of computer-readable memory. Examples of such memory are categorized in FIG. 1 as storage 118, random-access memory (RAM) 120, and BIOS or firmware 122. Storage 118 typically comprises a hard-disk or similar non-volatile memory, and may include external devices. RAM 120 may comprise electronic memory or other types of relatively fast, electronically-accessible memory. Firmware 122 may comprise read-only memory (ROM), flash memory, or any other type of persistent memory that can be accessed by the processor 116. Firmware 122 may include pre-boot information for the computer 102, such as instructions, modules, and/or routines for initializing itself and for obtaining its operating software. More specifically, the pre-boot information may comprise the instructions that the processor 116 will execute upon being powered on.

The network interface 106 may comprise an interface for a wired or wireless network connection, such as an Ethernet interface, a wireless 802.11x interface, a cellular data interface, or some other type of communications interface. The network interface 106 may include its own BIOS or firmware 124, which may be implemented as ROM, flash memory, etc., and which may contain initial operating instructions for the network interface 106. The network interface may be an integral part of the computer 102, or may be installable or removable. For example, the network interface may be installable by plugging it into a computer backplane, a USB port, or some other interface of the computer.

The initial operations of the computer 102 may be dictated by the computer's firmware 122, by the network interface's firmware 124, or by a combination of both. For example, the firmware 124 of the network interface 106 may be responsible for broadcasting a network configuration request to the local network 104, to which an available configuration server 108 may respond. The network interface 106 may then configure itself in response information received from the configuration server 108. This initial configuration information may include the network address of the computer 102 and other network parameters of the computer 102 and network interface 106, which when implemented allow the computer 102 to communicate over the local network 104 and the wide-area network 112. In some cases, the initial configuration information may also include provisioning information, such as the address or identification of the provisioning server 114, from which the computer 102 may obtain a bootable image.

More specifically, the configuration server 108 may be a DHCP server, and the network interface 106 may be configured through its firmware 124 to query the configuration server 108 for network configuration information using the DHCP protocol. As part of the DHCP protocol, the configuration server 108 may provide the network address of the provisioning server 114.

The computer firmware 122 may be responsible for other things, such as initially communicating with the network interface 106 and other input/output components of the computer 102. In some embodiments the computer firmware 122 may be responsible for network initialization, including initial communications with the configuration server 108, and in some cases the network interface 106 may not have its own dedicated firmware 124.

The firmware 122 or 124 may in some embodiments be further customized to contain authentication information or device credentials 126. The device credentials 126 allow the computer 102 to authenticate itself with the configuration server 108.

Similarly, the configuration server may have authentication or source credentials 128 that are provided to requesting computers to authenticate or prove the identity of the configuration server 108.

Note that the term "credentials" is used herein to indicate information that can be used to indicate and/or prove the identity and/or authorization of an entity. The term may also refer to information that allows an entity to verify the credentials of another entity. For example, credentials may include the public key corresponding to the private key that is held by another entity.

Upon receiving the source credentials 128, the computer 102 can ensure that it is communicating with an authorized configuration server 108. Similarly, the configuration server 108 can ensure, upon receiving the device credentials 126, that the requesting computer or device is authorized to operate on the local network 104. The device credentials 126 may also allow the configuration server 108 to reliably identify the computer 102, and to thereby provide customized configuration information for different devices.

The authentication procedures between the computer 102 and the configuration server 108 may include the exchange and/or validation of one or more certificates, signatures, credentials, keys, key pairs, and so forth, and may utilize cryptographic elements and techniques. For example, the device credentials 126 may include a public cryptographic key corresponding to a private cryptographic key belonging to the configuration server 108. In order to authenticate the configuration server 108, the configuration server 108 may provide a signature that has been created with the private key, which the computer 102 may validate using the corresponding public key. Similarly, the device credentials 126 may include account credentials that may be submitted to the configuration server 108 to authorize and/or authenticate the computer 102, and which grant the computer 102 privileges and/or authorization with respect to the configuration server 108.

Figure 2:
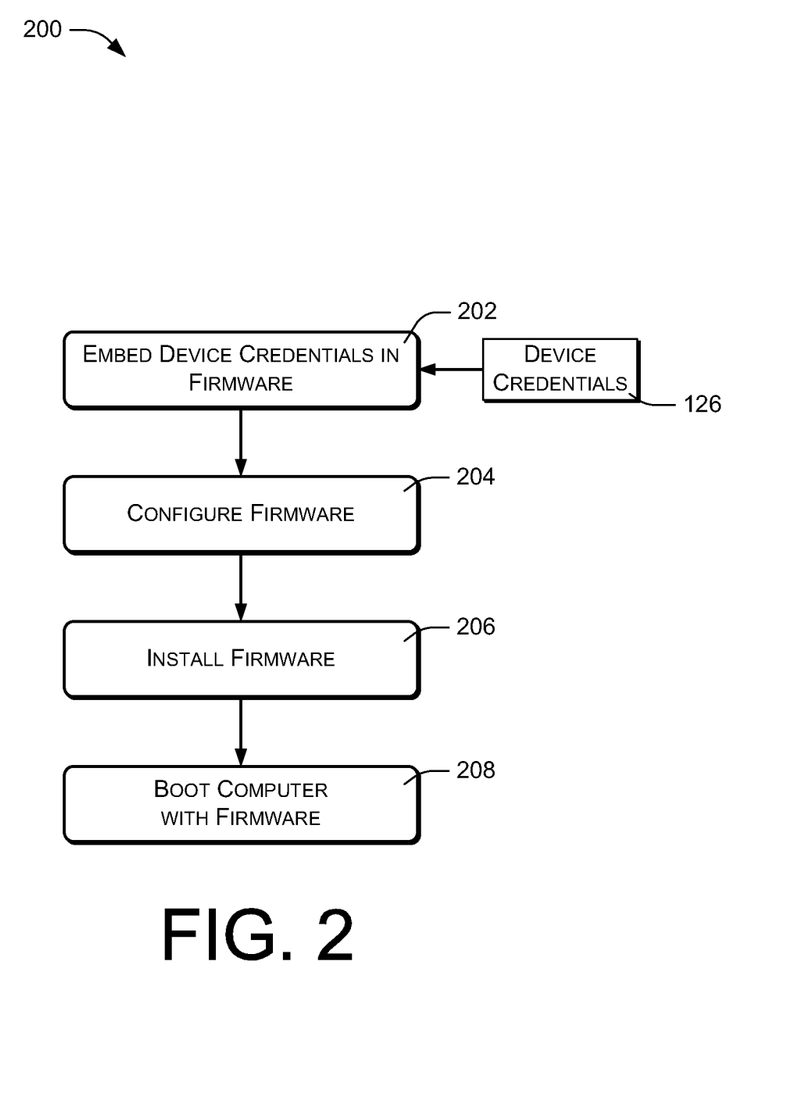
FIG. 2 is a flow diagram illustrating an example method of configuring a computer to securely obtain a network configuration over a local-area network.

FIG. 2 illustrates a process 200 for securely initializing and/or configuring a computer or computer-like device in a networked environment that includes automatic network configuration capabilities. The actions of the process 200 will be described with reference to the elements of FIG. 1, although it is to be understood that the process 200 may also be implemented in other environments.

In illustrated embodiment, an action 202 comprises embedding the device credentials 126 in the firmware 122 of the computer 102 or the firmware 124 of a computer sub-component such as the network interface 106. The device credentials 126 may comprise cryptographic keys, certificates, signatures, tokens, usernames, passwords, and so forth. The device credentials 126 can be used to authenticate the configuration server 108 as well as to authenticate or authorize the computer 102 with respect to the configuration server 108.

An action 204 may comprise configuring the firmware of the computer 102 or computer sub-component to utilize the device credentials, and to perform authentication procedures with the configuration server 108 prior to implementing any configuration information received from the configuration server. The initialization behavior of the configured firmware will be described in more detail below, with reference to FIG. 3.

An action 206 comprises installing the configured firmware into the computer 102. This may comprise "burning" the firmware to a hardware component of the computer or computer sub-component. The action 206 may also, or alternatively, comprise physically installing a pre-configured sub-component or other physical element in the computer or computer sub-component. For example, the action 206 may comprise installing a specially-configured network interface 106 into the computer 102, wherein the network interface 106 has previously been customized in accordance with the actions 202 and 204. Such a network interface card may be installed in a computer backplane, as a removable device such as a USB device, or by otherwise integrating with or attaching to the computer 102.

The firmware installation 206 may also be performed by attaching or installing a physical media to the computer 102, such as a floppy disk, a CD, a CD-ROM, or analogous media, and by loading the firmware from such media. Similarly, different types of devices may be used to load firmware or other initialization software onto the computer 102, such as different types of media drives, network devices, portable devices, and so forth. As an example, a U.S. patent application having Ser. No. 13/237,644, entitled "Mobile Provisioning Device", filed concurrently herewith, describes an intelligent portable device that may be used to provide initial configuration and/or firmware for the computer 102.

An action 208 may comprise booting or initializing the computer 102, using the firmware installed in the action 206. This may comprise executing the firmware upon powering on the computer 102.

Figure 3:
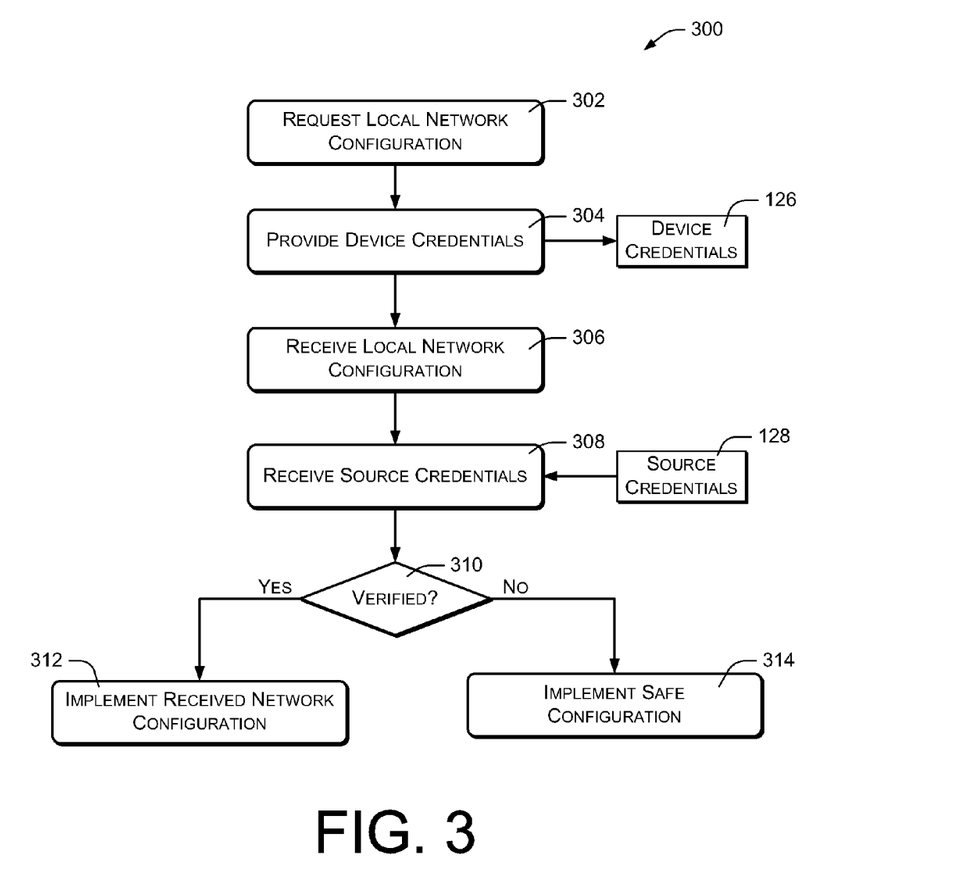
FIG. 3 is a flow diagram illustrating an example method of dynamically configuring a computer over a local-area network, performed by a requesting computer.

FIG. 3 illustrates an example of an initialization process 300 that may be performed by the firmware or other software, which has been customized and installed as described above with reference to FIG. 2. The process 300 represents the initialization or boot actions that are performed by the computer 102 upon being powered on or first connected to the local network 104, or upon initialization/re-initialization of a network connection. Thus, the actions of the process 300 may be implemented by computer-executable programs and/or processor instructions within the firmware 122 or 124 of the computer 102, by additional software stored in other non-volatile memory of the computer 102, or by a combination or sequence of software stored in different locations including other types of computer-readable memory. The actions will be described with reference to the components of FIG. 1.

An action 302 comprises requesting a local network configuration from the configuration server 108. This may comprise a DHCP request, also known as a DHCP "discover" message. An action 304 may comprise indicating or providing device credentials 126 to the configuration server 108 within the DHCP request, or otherwise associating device credentials 126 with the configuration request. As discussed above, the device credentials 126 may include a certificate, a signature, or some other type of data or information that is verifiable by the configuration server 108 to confirm authorization of the computer 102. For example, the computer 102 may encrypt an arbitrary piece of data using the private portion of its public/private asymmetric key pair. This allows the configuration server 108 to decrypt the data using the public portion of the key pair, thereby verifying that the computer 102 possesses the private portion. Other types of authentication may alternatively used, such as a password, a certificate that has been issued by or associated with the configuration server 108, and so forth.

The device credentials 126 may also include other information, such as one or more identifications of the computer 102. Such identifications may include the serial number of the computer 102 or one of its sub-components, the media access control (MAC) address of the computer 102 or one of its components, or the processor ID of the computer or one of its components. Computer identifications may also include other types of identifiers, including identifiers issued by manufacturers, distributors, retailers, users, and installers of the computer 102. The one or more computer identifications may be known to the configuration server 108, allowing the configuration server 108 to determine how to handle configuration requests from individual computers 102.

An action 306 comprises receiving a local network configuration that is proffered from the configuration server 108. The local network configuration may be indicated by a DHCP response from the configuration server 108, also referred to as a DHCP "offer." The received network configuration may include an IP address for adoption by the requesting computer 102, as well as other network parameters such as gateway addresses, domain name service (DNS) server addresses, communication parameters, and so forth. The received local network configuration may also specify a provisioning server 114 such as a PXE server.

An action 308 comprises receiving source credentials 128 from the configuration server 108. The source credentials 128 may be included as part of the DHCP response or may be communicated separately. The source credentials may include a certificate, a signature, or other data that can be verified by the receiving computer 102 as having originated with an authorized server, allowing the computer 102 to confirm the identity of the configuration server 108. As one example, the configuration server 108 may use a private key to encrypt data, such as a computer identification, that has been previously provided by the computer 102. The ability to decrypt this data, using the corresponding public key, may be used by the computer 102 as verification of the server's identity.

An action 310 comprises attempting to verify the received source credentials 128. If the source credentials 128 are verified by the computer 102, an action 312 is performed, comprising implementing the network configuration proffered by and received from the configuration server 108. Otherwise, if the computer 102 cannot successfully verify the source credentials 128 and there is therefore a failure to authenticate the configuration server 108, an action 314 is performed, which comprises implementing a safe or limited-capabilities configuration. The action 314 may comprise refusing to implement the network configuration proffered by the configuration server 108. Alternatively, it may comprise implementing the received network configuration but taking precautions against malicious attacks, such as limiting the activities or types of activities that the computer 102 is allowed to perform, particular with respect to network communications. For example, network provisioning might be disabled. In other embodiments, the action 314 may comprise booting with a predefined local boot configuration that does not allow network access. In some embodiments, the action 314 may comprise refusing to boot the computer 102.

Note that in some networks, multiple configuration servers may be available and may respond to the local network configuration request 302. In environments such as this, the computer 102 may be configured to sequentially attempt verification with multiple responding configuration servers until verification 310 is successful with respect to one of the configuration servers, and may then adopt the configuration offered by that configuration server.

Although the descriptions above assume that the device credentials 126 are embedded within firmware associated with the computer 102, the same information may in some embodiments be accessible to the computer 102 or its associated firmware in other ways. For example, the device credentials 126 may be retrieved by the computer firmware from a removable component or token such as a memory card or smartcard. Authentication procedures may be implemented so that communications with such a memory card or smartcard are secure and authenticated.

Figure 4:
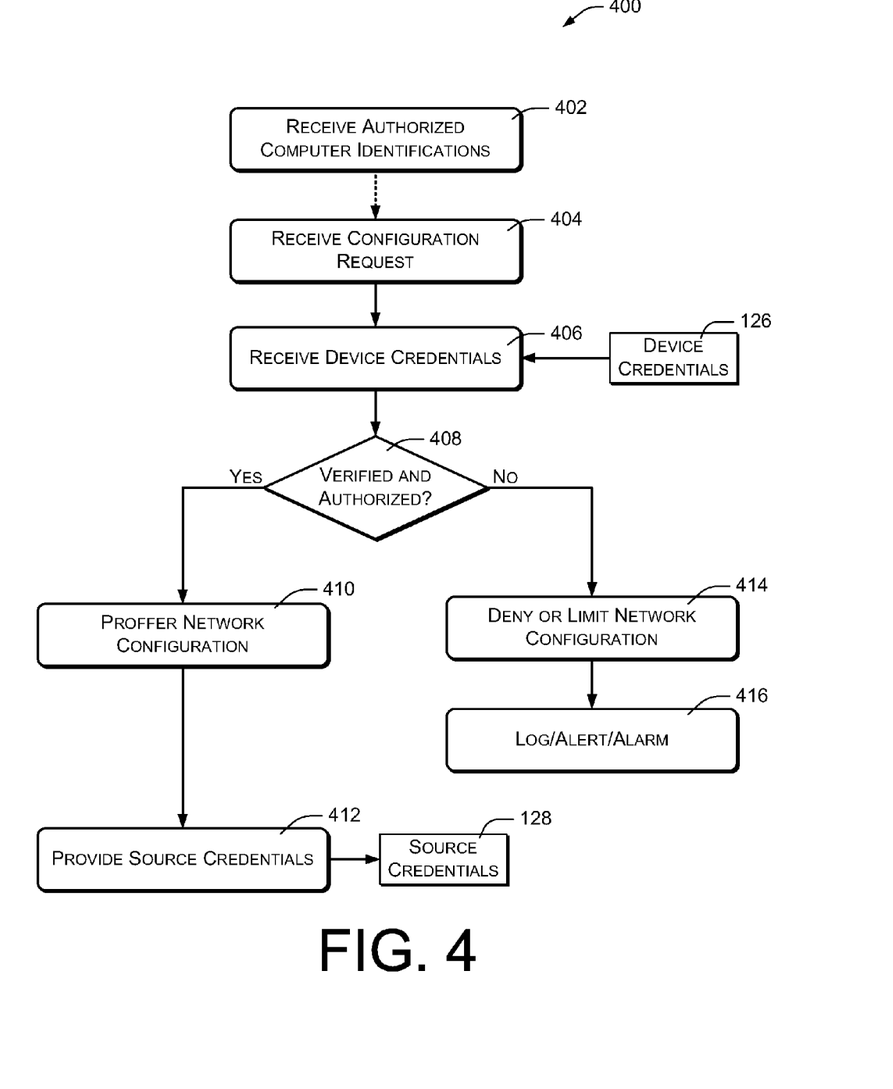
FIG. 4 is a flow diagram illustrating an example method of dynamically configuring a computer over a local-area network, performed by a configuration server.

FIG. 4 illustrates an example process 400 that may be implemented by the configuration server 108 to perform authenticated initialization of the computer 102. An action 402, which may be performed in some embodiments, comprises receiving identifications of authorized computers. This may be performed in a configuration step or through an automated process. For example, a technician may manually enter the serial numbers of computers that are expected to be connected to the local network 104. Alternatively, serial numbers, MAC addresses, processor IDs, or other identifications may be provided by enterprise applications that are associated with purchasing, provisioning, or other activities. Computer identifications may be globally unique, or may be characteristic of a class, type, or group of computers that are to be authorized with respect to the local network 104.

An action 404 comprises receiving a configuration request from the computer 102. The configuration request may comprise a DHCP "discover" message. An action 406 comprises receiving the device credentials 126, which may comprise part of the configuration request or may be provided separately. The configuration request and/or the credentials may also include one or more identifications of the computer 102, as discussed above, which may include a serial number, a MAC, a processor ID, and so forth.

An action 408 comprises attempting to verify the received device credentials 126, to confirm authorization of the computer 102. The device credentials may be verified as described above, such as by validating a digital certificate that is included in the credentials. In addition, one or more computer identifications provided by the computer 102 may be compared against the computer identifications received in the action 402, to determine whether the requesting computer has been pre-authorized for operation on the local network 104.

If the device credentials 126 are verified and the requesting computer 102 is authorized, an action 410 is performed, which comprises proffering a network configuration. Because the requesting computer has been verified as being authorized on the local network 104, a full-capabilities configuration may be proffered, allowing the computer 102 to perform normal network functions with respect to the local network 104. For example, the computer 102 may be placed on a privileged or protected subnet within the local network 104. The action 410 may be performed as a DHCP "offer."

In addition to providing a network configuration, an action 412 may be performed, which comprises providing source credentials 128 of the configuration server 108 to the requesting computer 102. In some implementations, the source credentials may be included in the network configuration request or DHCP offer.

Note that in some embodiments, the network configuration is proffered to a requesting computer only if the identification of the networked device is among those of previously authorized devices. In other embodiments, different network configurations may be proffered, depending on the identification of the requesting computer 102. Thus, the configuration server 108 may be configured to select the proffered network configuration from different alternatives, based on the identification of the computer 102. As an example, certain requesting computers may be assigned to various of different subnets.

If the device credentials 126 are not verified, or the computer 102 has not been pre-authorized for operation on the local network 104, an action 414 is performed, which comprises denying a network configuration or proffering a limited-capabilities network configuration that limits the capabilities and/or accessibility granted to the requesting computer 102. For example, the configuration server 108 may proffer a network configuration that places the requesting computer 102 on an isolated subnet, with access to the Internet but no access to other local network devices.

In addition, an action 416 may be performed, comprising logging, alerting, and/or alarming. For example, the failure to authorize a requesting computer may be logged, along with information that might be used to identify the computer. Simultaneously, technicians may be alerted to the event, and in some implementations an alarm might be triggered so that technicians can investigate the event immediately or so that other protective measures might be implemented.

Figure 5:
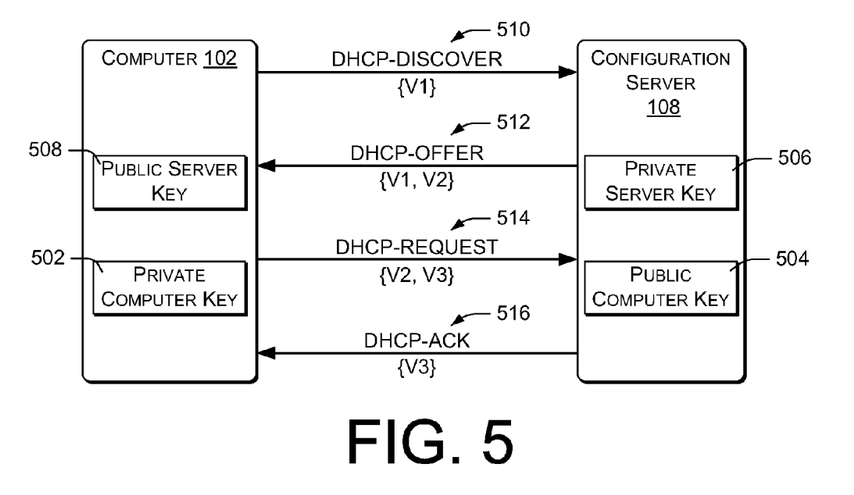
FIG. 5 is a block diagram illustrating a sequence of communications performed between a requesting computer and a configuration server to securely configure the computer for further communications over a local-area network.

FIG. 5 illustrates a sequence of communications that might be implemented in conjunction with the techniques described above, when implemented with DHCP. This sequence illustrates one or many possible ways for the computer 102 and the configuration server 108 to authenticate with each other during an automated network configuration procedure.

The example of FIG. 5 assumes that the computer 102 and the configuration server 108 have exchanged cryptographic keys. In this example, each of the two entities has an asymmetric public/private key pair, comprising a public key portion and a private key portion. Specifically, the computer 102 has a computer key that comprises a private portion 502 and a public portion 504. The configuration server 108 has a server key that comprises a private portion 506 and a public portion 508. The private portion 502 of the computer key is held secret by the computer 102, and the public portion 504 of the computer key is shared with the configuration server 108. Likewise, the private portion 506 of 508 server key is held secret by the configuration server 108, while the public portion 504 of the server key is shared with the computer 102.

During an initial communication 510, the computer 102 issues a DHCP-DISCOVER message 510 on the local network. An encrypted value V1 is appended to or included with the DHCP-DISCOVER message. Note that in FIG. 5, curly braces are used to indicate encrypted values.

The value V1 may be an arbitrary value known initially only to the computer 102. Alternatively, it may comprise one or more computer identifications as described above. V1 is encrypted, prior to its inclusion in the DHCP-DISCOVER message 510, using the private portion 502 of the computer key. The configuration server 108 receives the DHCP-DISCOVER message and decrypts V1 using the public portion 504 of the computer key. The ability to decrypt V1 with the public key 504 serves as an authentication of the computer 102.

The configuration server responds at 512 with a DHCP-OFFER message. An encrypted version of V1 and V2 is appended to or included in the DHCP-OFFER message. V1 is the value decrypted by the configuration server 108 from the initial DHCP-DISCOVER message, and V2 is some other value supplied by the configuration server 108, such as an arbitrary string that is initially known only to the configuration server 108. V1 and V2 are encrypted using the private portion 506 of the server key.

The DHCP-OFFER is received by the computer 102, which decrypts V1 and V2 using the public portion 508 of the server key. The computer 102 checks V1 to ensure that it is the same value that was initially included in the DHCP-DISCOVER message, thereby authenticating the configuration server 108.

The computer 102 then makes a DHCP-REQUEST at 514, to which is appended an encrypted V2 and V3. V2 is the value previously received from the configuration server, while V3 comprises a new string or value. V2 and V3 are encrypted using the private portion 502 of the computer key.

The configuration server 108 receives the DHCP-REQUEST and decodes V2 and V3 using the public portion 504 of the computer key. The configuration server 108 confirms that V2 is the same as was previously send to the computer 102 in the DHCP-OFFER.

The configuration server 108 then sends a DHCP-ACK message to the computer 102 at 516. V3 is included in the DHCP-ACK message 516, after being encrypted using the private server key 506. The computer 102 receives the DHCP-ACK message and decodes V3 using the public server key 508, and ensures that V3 has remained unchanged.

Figure 6:
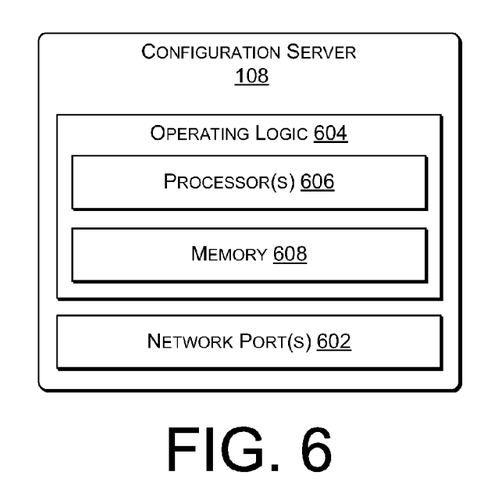
FIG. 6 is a block diagram showing high-level components of an example configuration server.

FIG. 6 shows an example implementation of the configuration server 108. The functions of a configuration server, such as a DHCP server, may comprise any of various types of devices, including networked computers and other networked components such as routers, switches, hubs, access points, and so forth. Generally, such devices one or more network ports 602 and operating logic 604 that uses the network ports 602 to communicate with networked devices or hosts. The operating logic in some embodiments may comprise one or more processors 606 and associated computer-readable memory 608. The memory 608 contains instructions that are executable by the one or more processors 606 to implement the functionality described above with reference to the configuration server 108. The memory 608 and its instructions may in some cases comprise device firmware. In other cases, the instructions may be stored in other types of computer-readable memory such as system memory, disk memory, electronic memory, and so forth. The instructions may also be distributed on various types of computer-readable memory such as various types of disks and portable electronic media.

Architectures other than those described above may be used to implement the described functionality, including the functionality of the computer 102 and the configuration server 108. Furthermore, although specific distributions of responsibilities are defined above for purposes of discussion, the various described functions and responsibilities might be distributed and divided in different ways, depending on particular circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A networked device comprising:
   one or more processors;
   firmware that specifies device credentials;
   computer-readable memory containing instructions that are executable by the one or more processors to perform actions comprising:
   requesting a network configuration from a configuration server;
   indicating the device credentials to the configuration server, the device credentials being verifiable by the configuration server to confirm authorization of the networked device;
   receiving source credentials from the configuration server, the source credentials being verifiable by the networked device to authenticate the configuration server;
   attempting to verify the received source credentials;
   if the received source credentials are verified, implementing a network configuration that is proffered by the configuration server; and
   if the received source credentials are not verified, selectively refusing to implement the network configuration that is proffered by the configuration server and implementing a limited-capabilities network configuration.

2. The networked device of claim 1, the actions further comprising, if the received source credentials are not verified, selectively implementing a pre-defined local boot configuration.

3. The networked device of claim 1, the actions further comprising, if the received source credentials are not verified, selectively refusing to boot the networked device.

4. The networked device of claim 1, the actions further comprising, if the received source credentials are not verified:
   selectively implementing the network configuration that is proffered by the configuration server; and
   limiting activities of the networked device.

5. The networked device of claim 4, wherein the firmware comprises a system BIOS of the networked device.

6. The networked device of claim 4, wherein the firmware is part of a network interface utilized by the networked device.

7. The networked device of claim 4, the actions further comprising providing an identification of the networked device that is known to the configuration server.

8. The networked device of claim 1, wherein the firmware comprises a system BIOS of the networked device.

9. The networked device of claim 1, wherein the firmware is part of a network interface utilized by the networked device.

10. The networked device of claim 1, the actions further comprising providing an identification of the networked device that is known to the configuration server.

11. A method comprising:
    receiving a network configuration request from a networked device;
    receiving device credentials from the networked device;
    attempting to verify the device credentials to confirm authorization of the networked device;
    if the received device credentials are verified, proffering a full-capabilities network configuration to the networked device; and
    if the received device credentials are not verified, proffering a limited-capabilities network configuration to the networked device.

12. The method of claim 11, wherein the network configuration is proffered by a source, the method further comprising providing source credentials that are verifiable by the networked device to authenticate the source of the network configuration.

13. The method of claim 11, wherein the device credentials include an identification of the networked device, the method further comprising:
    receiving identifications of authorized networked devices; and
    proffering the full-capabilities network configuration to the networked device if the identification of the networked device is among those of the authorized network devices.

14. The method of claim 11, wherein the device credentials include an identification of the networked device, the method further comprising selecting the full-capabilities network configuration or the limited-capabilities network configuration from different alternatives based at least in part on the identification of the networked device.

15. The method of claim 11, wherein the full-capabilities network configuration specifies a device address for use by the networked device on a network.

16. The method of claim 11, wherein the full-capabilities network configuration specifies a device address and a network gateway address for use by the networked device on a network.

17. The method of claim 11, wherein the full-capabilities network configuration specifies a provisioning server for use by the networked device.

18. The method of claim 11, wherein the limited-capabilities network configuration proffered to the networked device places the networked device on an isolated subnet.

19. The method of claim 18, wherein the limited-capabilities network configuration proffered to the networked device provides Internet access but no access to other local network devices.

20. A networked device comprising:
    one or more processors;
    firmware that specifies authentication information;
    computer-readable memory containing instructions that are executable by the one or more processors to perform actions comprising:
    submitting a network configuration request;

receiving source credentials from a configuration server;
attempting to authenticate the configuration server based at least in part on the received source credentials and at least in part on the authentication information;
upon successfully authenticating the configuration server, implementing a network configuration that is proffered by the configuration server; and
selectively refusing to implement the network configuration that is proffered by the configuration server and implementing a limited-capabilities network configuration if authenticating the configuration server fails.

21. The networked device of claim 20, the actions further comprising, upon failure of the authenticating:
selectively implementing the network configuration that is proffered by the configuration server; and
limiting activities of the networked device.

22. The networked device of claim 20, the actions further comprising associating device credentials with the network configuration request.

23. The networked device of claim 20, the actions further comprising associating device credentials with the network configuration request, wherein the device credentials indicate one or more device identifications.

24. The networked device of claim 20, wherein the network configuration that is proffered by the configuration server specifies a device address.

25. The networked device of claim 20, wherein the network configuration that is proffered by the configuration server specifies a device address and a network gateway address.

26. The networked device of claim 20, wherein the network configuration that is proffered by the configuration server specifies a device address, a network gateway address, and a naming service address.

27. A method comprising:
submitting a network configuration request from a networked device to a configuration server;
associating device credentials with the network configuration request, the device credentials to be validated by the configuration server to confirm authorization of the networked device;
receiving a full-capabilities network configuration from the configuration server upon successful validation by the configuration server of the device credentials; and
receiving a limited-capabilities network configuration from the configuration server if the device credentials are not verified.

28. The method of claim 27, further comprising:
receiving source credentials from the configuration server; and
validating the source credentials prior to implementing the full-capabilities network configuration.

29. The method of claim 27, wherein the full-capabilities network configuration specifies one or more of a device address, a network gateway address, and a naming service address.

30. A method comprising:
receiving a network configuration request from a networked device;
proffering a full-capabilities network configuration or a limited-capabilities network configuration to the networked device at least partly in response to the network configuration request; and
associating source credentials with the full-capabilities network configuration, wherein the proffered full-capabilities network configuration is implemented if the source credentials are validated and wherein the limited-capabilities network configuration is implemented if the source credentials are not validated.

31. The method of claim 30, further comprising:
receiving device credentials from the networked device; and
verifying the device credentials to confirm authorization of the networked device to receive the full-capabilities network configuration.

32. The method of claim 30, wherein the full-capabilities network configuration specifies one or more of a device address, a network gateway address, and a naming service address.

* * * * *